Nov. 26, 1968  A. D. STRUBLE, JR  3,412,963
METHOD AND APPARATUS FOR SUPPORTING AN OBJECT
Filed May 24, 1965  3 Sheets-Sheet 1
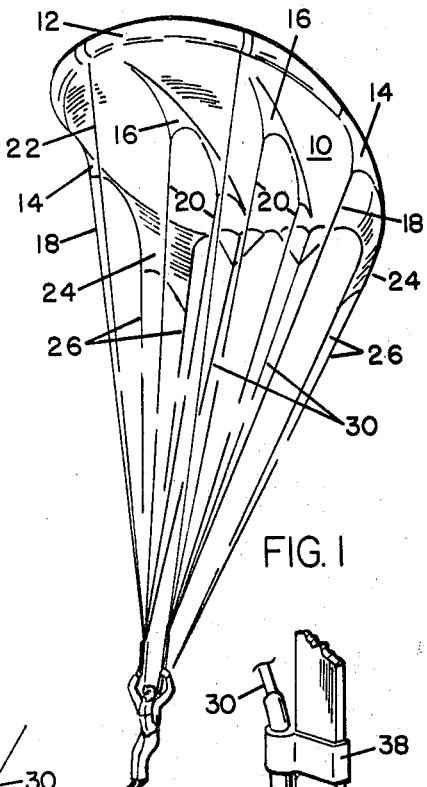
FIG. 1
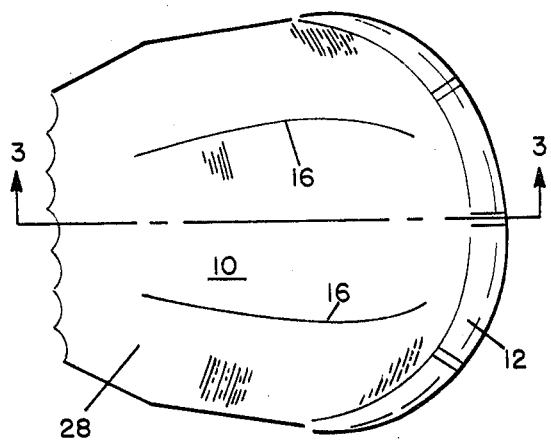
FIG. 2
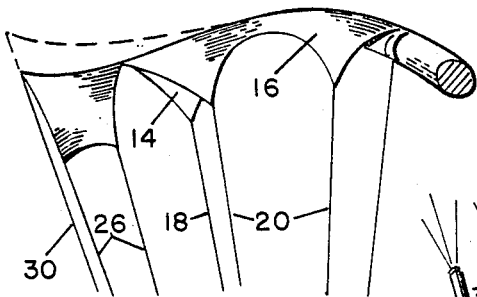
FIG. 3
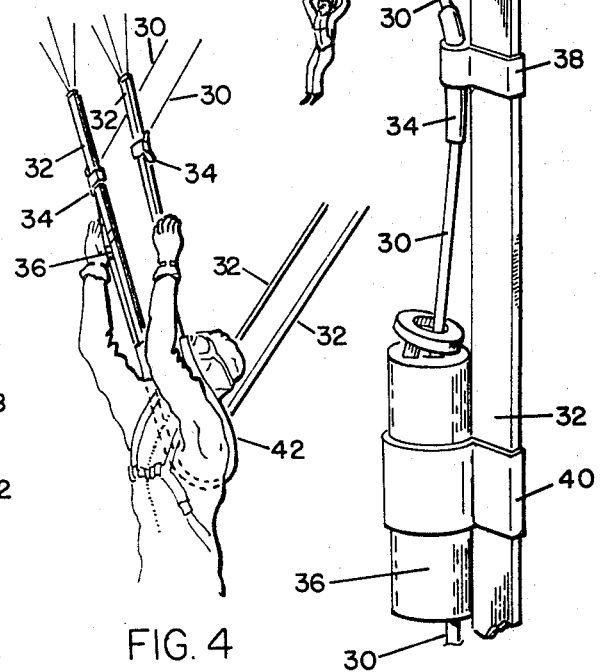
FIG. 4
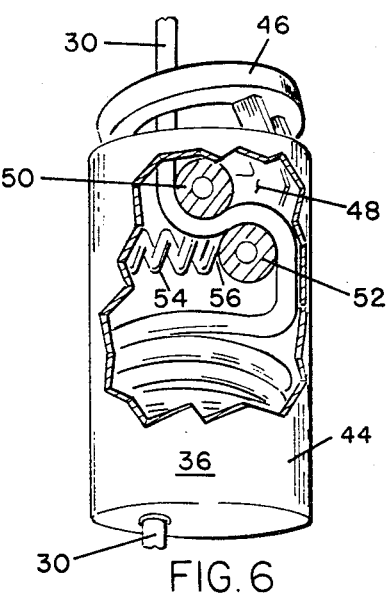
FIG. 6
FIG. 5

//////
United States Patent Office 3,412,963
Patented Nov. 26, 1968

3,412,963
METHOD AND APPARATUS FOR SUPPORTING AN OBJECT
Arthur D. Struble, Jr., 1754 S. Crenshaw Blvd., Torrance, Calif. 90501
Continuation-in-part of application Ser. No. 423,274, Jan. 4, 1965. This application May 24, 1965, Ser. No. 458,168
29 Claims. (Cl. 244—146)

The present invention is related to a method and apparatus generically disclosed in United States patent application, Serial No. 423,274, filed January 4, 1965, by the present applicant, and entitled "Lofting Method and Apparatus," of which the present application is a continuation-in-part.

The present invention relates to vehicles for supporting an object above the surface of the earth and to methods of releasing and controlling said objects. More specifically, the present invention relates to a controllable glider adapted to support an object above the surface of the earth or lower an object or a man to the surface of the earth. In another aspect of the present invention, the present invention relates to an inflatable device and to a method of inflating the same.

It is often desirable to loft a payload, such as, an instrument pack or the like, above the surface of the earth and to maintain the payload suspended above the earth for a period of time. It is also desirable to change either the elevation or geographical position of such a payload or to gradually lower such a payload or a man to the surface of the earth. One aspect of the present invention is to provide an improved glider means for suspending a payload above the surface of the earth, maneuvering a payload among preselected elevations or geographical locations and controllably lowering a payload or a man to the surface of the earth. Another aspect of the present invention is to provide a controllable glider having a lift to drag ratio adapted to provide a long glide path. Still another aspect, the present invention relates to improved inflatable devices of the character referred to, and a method of packing, releasing and inflating the same.

The above objectives will be apparent from the following detailed description, when read in conjunction with the drawings, wherein:

FIGURE 1 is an isometric, elevational view of a glider in accordance with the present invention lowering a man to the surface of the earth;

FIGURE 2 is a partial bottom view of the glider of FIGURE 1;

FIGURE 3 is a cross-sectional view taken along the line 3—3 of FIGURE 2;

FIGURE 4 illustrates the connection of the glider and its controls to the harness of the operator;

FIGURE 5 shows an enlarged view, partially in section, of a control mechanism for the device of FIGURE 1;

Figure 7:
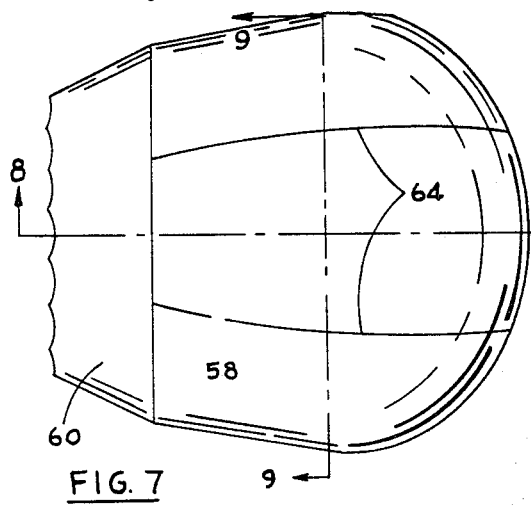
Figure 9:
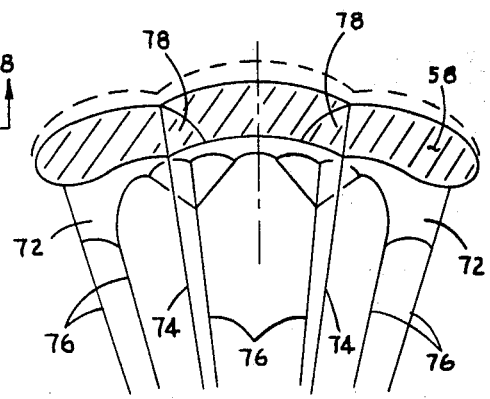
Figure 8:
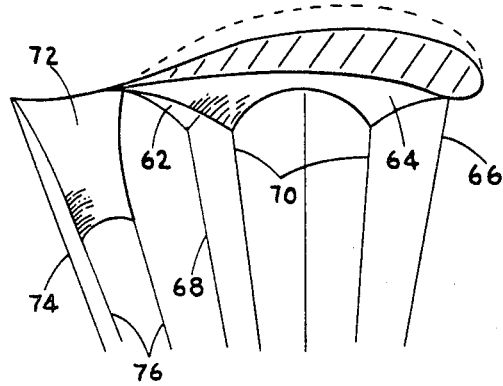
Figure 10:
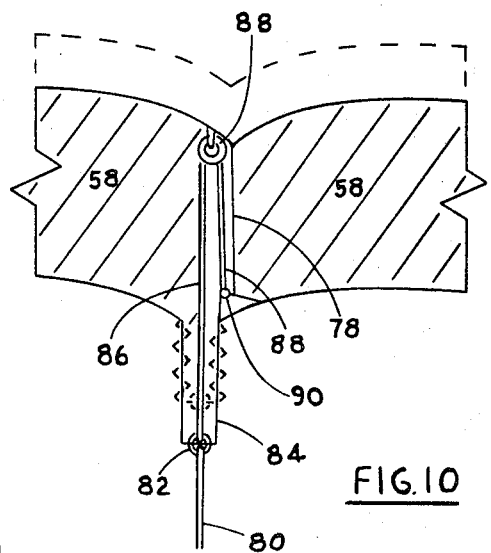
Figure 11:
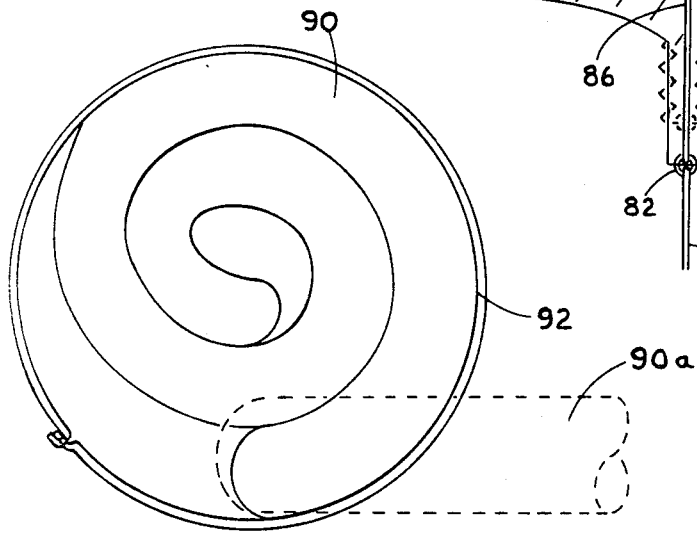
Figure 12:
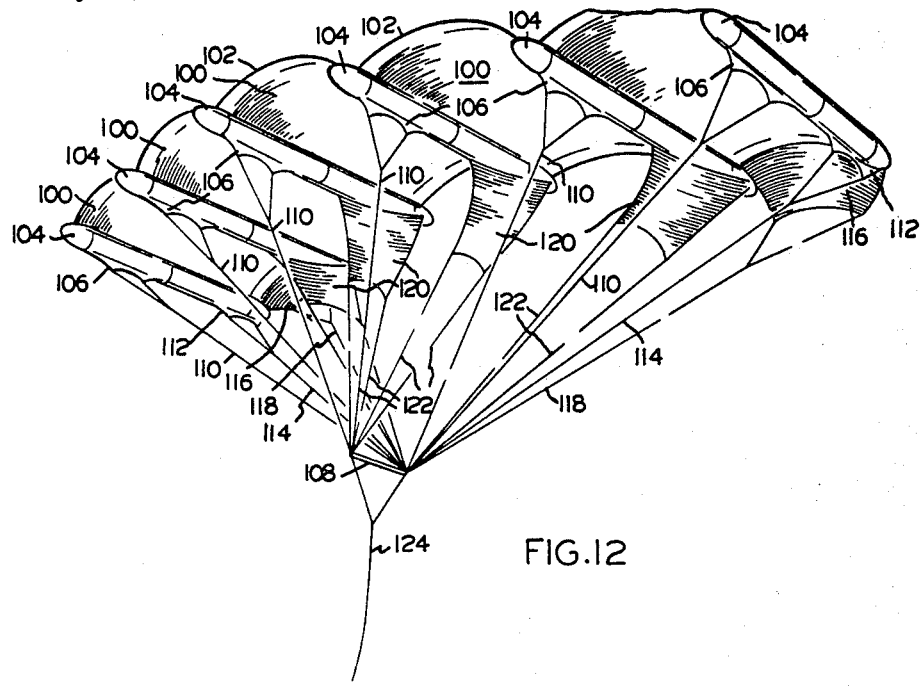
Figure 13:
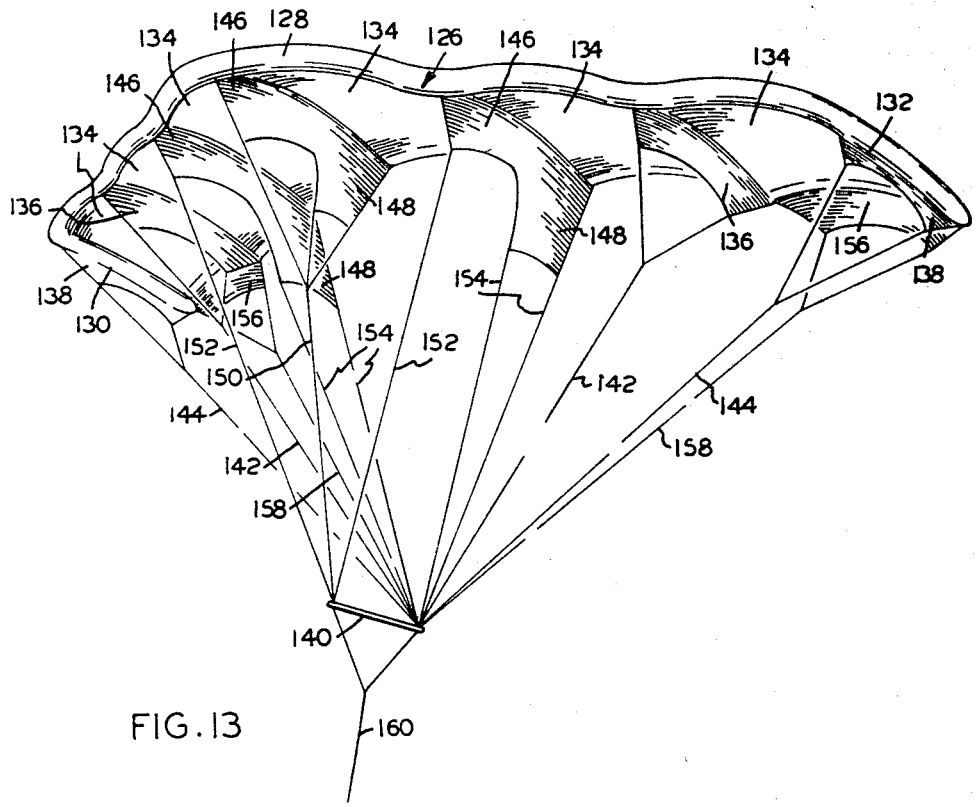

FIGURE 6, partially in section, shows the details of the control of FIGURE 5;

FIGURE 7 is a bottom view, partially in section, of a modification of the glider of FIGURE 1;

FIGURE 8 is a cross-sectional view, taken along the line 8—8 of FIGURE 7;

FIGURE 9 is a cross-sectional view, taken along the line 9—9, of FIGURE 7;

FIGURE 10 illustrates the details of a mechanism for controlling the glider of FIGURES 7 through 9;

FIGURE 11 illustrates a technique for inflating a device of the character illustrated in FIGURES 7 through 10, or a like inflatable device;

FIGURE 12 is an isometric, elevational view of another version of the glider of the present invention; and FIGURE 13 is an isometric, elevational view of a variation of the glider of FIGURE 12.

Referring now in detail to the drawings, FIGURES 1 through 6 illustrate a controllable fabric glider. The glider may be utilized as a parachute-type vehicle to lower a man to the surface of the earth, as shown in FIGURE 1, it may be utilized to lower a payload to the surface of the earth, it may be utilized to loft and maintain aloft a payload and it may be utilized to maneuver a suspended payload among several elevations or geographical locations. In the latter instance, it may be tethered to the ground by suitable lines, either connected directly to the vehicle or connected to the vehicle through a payload or other object. In any event, the glider can be remotely or immediately controlled to glide over a long geographical distance in descending from a point above the surface of the earth. The glider comprises a generally flat, fabric body or canopy portion 10. Canopy 10 has formed along its curved front portion an inflated leading edge 12. It is to be observed that leading edge 12 is primarily a stiffening means, in the embodiment of FIGURE 1. Accordingly, leading edge 12 may be inflated as shown, it may be filled with a foam material, such as, polyethylene foam which can be pressed together to a volume of about 1/10 of its expanded volume and then released to expand and fill leading edge 12 to the configuration shown, or it may be simply a stiffening rod or rods, such as, a fiber glass rod which can be wound up into a small confined area and which has sufficient resiliency to form the contours shown when released. For example, a fiber glass rod for use in the present invention can be rolled up into a confined area having a diameter of about 18 inches and thus fit a pack on the back of a man. Fiber glass rods of sufficient length to form leading edge 12 of the glider and which can be formed into a circular pack about 18 inches in diameter should be less than about 0.25 inch in cross-section, preferably less than 0.15 inch in cross-section. Specficially, a fiber glass rod about 0.10 inch in diameter has been found satisfactory for this purpose.

As previously indicated, canopy 10 is a generally-flat piece of material having a rounded leading edge 12, generally-flat sides, generally-angled rear corners where the hereinafter-mentioned rudders are attached and a generally-straight rear edge. Formed along the edge on either side of canopy 10 are load flaps 14. Passing generally through the center of canopy 10 are load webs 16. Load webs 16 are adapted to give canopy 10 an air foil-type cross-sectional configuration as shown in FIGURE 3. Load webs 16 and load flaps 14 are adapted to support the object below the canopy 10 and for this purpose have connected thereto load lines 18 and 20, respectively. In addition, load lines 22 are attached to inflated leading edge 12 by appropriate reinforcing bands. Insasmuch as canopy 10 is a generally-flat piece of fabric, it is to be noted that a semi-rigid leading edge 12 is necessary to prevent the fabric from buckling when a large pressure caused by the air against the front of the glider is present during a gliding operation. The air pressure entering beneath the canopy from the front, in combination with the configuration of canopy 10, permits the control of the glider to change its geographical location or to bring about turning or horizontal movement. To accomplish this, two generally-flat pieces of fabric are attached to the rear corners of canopy 10 and act as rudders in the position shown. Rudders 24 should be at a slight angle to the flow of air from the front of the device. For example, it has been found that excellent control of the vehicle can be accomplished by placing rudders 24 at an angle of 10 to 15° with respect to the side of the vehicle. By positioning rudders 24 at an angle as indicated, the wind is always pushing against the rudders; and even if the vehicle yaws a slight amount they will still have an angle of attack to the air from the front and remain full, rather than flutter. While not absolutely necessary, it is also desirable, to render the vehicle dynamically stable, to have a reflex trailing edge or flap 28. Flap 28 is simply an extension of canopy 10 but is controllable to permit upward or downward movement as illustrated by the dashed line of FIGURE 3. Movement of trailing flap 28 is effected by control lines 30. Control lines 30 are attached to trailing edge 28 by appropriate second lines. It is quite obvious that lines 30 may be operated in unison or differentially to lower or raise both sides of flap 28 simultaneously, or to lower or raise one side only. By moving lines 30 in unison, the trailing flap 28 is lowered or raised thereby pitching the glider up or down as the tail does on an airplane. By operating lines 30 differentially, a rolling motion results in the same fashion as an airplane does when the ailerons are operated so that the lift vector is offset and the vehicle will then have a turning moment or a rolling moment which will then allow the force on the vehicle to turn the vehicle and thus permit adjustment of the direction or change the geographical position during descent. Load lines or risers 18, 20 and 22 and rudder lines or risers 26 pass downwardly and terminate at two common points attached to straps 32. Straps 32 are, in turn, attached to the harness of the operator or to an appropriate payload or tethering lines. However, lines 30 are controllable and therefore run separately through sleeves 34 where they can be manually pulled and to control units 36, adapted to aid control during landing. Sleeve 34 and control unit 36 are attached to straps 32 by means of appropriate clamps 38 and 40, respectively. Lines 30, as shown in FIGURE 4, pass from control units 36 and may be formed as a continuous line passing through tube 42 around the back of the operator. By passing lines 30 through sleeves 34, and thus tying these lines to straps 32, and then passing them to a point behind the operator, lines 30 and control unit 36 are brought to a forward position in sight of the operator, rather than to a point behind the operator, where they would normally fall. The operating mechanism of control unit 36 is shown in detail in FIGURE 6. As shown in FIGURE 6, line 30 passes through genenerally-cylindrical body chamber 44 of control unit 36. As shown, line 30 has an excess amount adapted to permit flap 28 to be raised and this excess is coiled in the bottom of chamber 44. From the bottom of chamber 44, line 30 then passes downwardly and through tube 42, as previously pointed out, and is prevented from coming out the bottom of chamber 44 by appropriate knots or the like. Control unit 36 is also provided with a spring-loaded ring or button 46 attached to the top of chamber 44. Mounted on ring 46 is arm 48, carrying pulleys 50 and 52. As shown, line 30 passes over pulley 50, then over pulley 52, and finally to the coil in the bottom of chamber 44. Ring 46 is held in its upward open position as shown in the drawings through the tension of spring 54 attached to the internal wall of chamber 44 and passing over boss 56 of arm 48. In operation, line 30 is generally held coiled in the bottom of chamber 44 and the operator can glide without any action on his part being necessary or, for that matter, the operator could be unconscious and the glider would still fly properly. Spring 54 holds line 30 in this position and prevents the release of line 30 by holding line 30 against the interior of chamber 44. By pressing down on ring 46, line 30 is released and it can rapidly be fed out. Obviously, appropriate means can also be included to recoil or pull in line 30. The rapid release of the excess of line 30 is necesary in landing the glider. When the pilot is ready to land, it is necessary to make the nose of the glider pull upwardly so that it will generate more lift, slow him down and stop the vertical descent. In other words, the vertical descent must be substantially stopped or slowed radically and, in addition, forward movement must be stopped or slowed. Idealy, the operator comes to a complete stop just as he touches the ground. In actuality, a slight forward and downward movement will exist at the time of contact, but a skilled operator can compensate for this just as he does in an ordinary parachute. Accordingly, in order to stop the descent and stop the forward movement, the nose of the vehicle must come up rather sharply so as to build up a lifting force upwardly and backwardly. In order to get the nose of the vehicle to move up sharply, flap 28 is regulated. Specificaly, flap 28 is permitted to move up, as one does on the tail of an airplane, and thus a downward moment is created on the tail which will make the nose rise rather sharply. This maneuver has to be done rather quickly and, as indicated, is accomplished by pressing ring 46 down. However, if ring 46 is not pressed down, lines 30 are held in a coiled position, thus holding trailing flap 28 down and the vehicle will fly normally without the intercession of the operator. If the holding and release mechanism 36 were not provided, the operator would have to hold the lines 30 throughout most of his descent. If he let go of the lines 30, the vehicle would stall, which is not desirable since the rate of descent would increase sharply. However, even if stalling occurred, the rate of descent would be no greater than an ordinary parachute.

FIGURES 7 through 10 illustrate a modification of the glider in which a generally-flat body portion or canopy 58 is provided. Inflated portion 58 has formed along its rearward end a trailing edge or trailing flap 60 of the same general configuration and for the same purpose as flap 28 of the previously-described device. Also, as in the previously-described device, load flaps 62 are provided along the sides and load webs 64 through the center of canopy 58. Load lines or risers 66, 68 and 70 are connected to canopy 58, load flap 62 and load web 64, respectively. Attached to the sides of the glider and performing the same function as in the previous instance, are rudders 72 to which are connected rudder lines or risers 74. Trailing flap 60 is attached to and controlled by control lines 76. As previously indicated, canopy 58 is inflated and, as shown in FIGURES 8 and 9, the elastic membranes 78 pass through the interior of canopy 58 in the same general location as load flaps 64 are attached. However, more than two elastic membranes 78 may be provided and the elastic membranes may be positioned at different locations than load webs 64. The purpose of elastic membranes 78 is to keep canopy 58 superpressurized so it will resist the force of the wind against the leading edge. As the vehicle changes altitude and the air becomes more dense or less dense, the volume of canopy 58 changes as shown in FIGURE 9 by the dashed outline. When the air becomes more dense and the canopy 58 is compressed by the air, the elastic membranes will put an additional compressional force on it, superpressurizing canopy 58 so its leading edge can resist the force of the air. This is shown by the full line outline of FIGURE 9. At higher altitudes, or where the sun is warm and the gas in canopy 58 is heated, the canopy 58 will expand, as shown by the dashed outline of FIGURE 9. If the gas in canopy 58 is sufficient to maintain the object or man it is supporting stationary, gliding can be accomplished by valving gas out or by compressing the membrane 78 and reducing the volume of canopy 58. A mechanism for controlling the volume of inflated canopy 58 is shown in detail in FIGURE 10. In accordance with FIGURE 10, membrane 78 is expanded or contracted by operating line 80, which leads to a control within the reach of the operator. Line 80 is connected to ring 82 and ring 82 is sealed in contractable tube 84. Connected to the portion of ring 82 within tube 84 is line 86, which passes over pulley 88, which is fixed to membrane 78 or the top of canopy 58 and thence to ring 90, which is also fixed to membrane 78 or the bottom of canopy 58. Tube 84 is superpressurized as is canopy 58, and preferably is formed as a part of the canopy. Tube 84 serves the vital function of permitting the operator to operate line 80 without releasing gas from canopy 58. Thus, elastic membranes can be contracted and tube 84 will be extended, as shown in FIGURE 10, by holding down or pulling on line 80. However, by releasing line 80, tube 84 will be collapsed, as shown by the dashed outline, and the gas within canopy 58 will expand the canopy, as shown by the dashed outline pulling pulley 88 to the alternate position shown dashed and stretching elastic membrane 78. Obviously, by reducing the volume of canopy 58 the buoyancy is reduced and by increasing the volume the buoyancy is increased. Membrane 78 need not be solid, as shown, but may have apertures therethrough so that canopy 58 is a single unitary chamber as opposed to three separate chambers, as shown in the drawings. Thus, it is apparent that the volume and lift of canopy 58 can be varied at will to change altitudes. It has been found that a very small change in the volume of canopy 58 will be sufficient for most purposes.

FIGURE 11 illustrates the technique by which the inflated canopy of the present invention or any other inflatable device can be packed into a small unit and then released to an expanded inflated form. In accordance with FIGURE 11, elastic chamber 90 is curled into a small roll and held tightly in that position by a clamping device, such as, band 92. Chamber 90 is filled with an appropriate liquefied gas, such as a refrigerant gas, for example, Freon. The liquefied Freon is introduced into, and maintained in, chamber 90 at a low pressure, for example, 50 p.s.i. The liquefied Freon, since it is liquid, permits the coiling or packing of chamber 90 in a very small space. However, when clamp 92 is released, the liquefied Freon flashes into a gas and the volume of chamber 90 increases very substantially. It is obvious that when clamp 92 is released, chamber 90 will unroll and expand, as shown by the dashed outline, partially in section, and designated 90a. Gases other than Freon, such as ammonia gases, which are liquefiable at a relatively low pressure in the neighborhood of about 20–50 p.s.i. are suitable for use in accordance with the present invention. By the same token, it is quite obvious that this technique of tightly packing an inflatable device, disposing a liquefied gas in the packed device under pressure, and suddenly releasing the pressure to expand the device, may be used in any of a variety of items, in addition to the inflated glider specifically referred to. For example, the device and technique may be used to form an inflatable antenna or tower. It could also be used to suddenly release a lighter-than-air device, such as, a balloon, from a remote position above the surface of the earth. In any event, it is significant to recognize that the inflation technique involves no expansion valves, no compression equipment of any kind, and no separate container other than the inflatable device itself and thus differs radically from prior art devices containing such valves, compression devices and pressurized cylinders.

In accordance with FIGURE 12, a modified version of the previously described lift-vehicles is shown. While FIGURES 1 through 3 show a cloth or fabric vehicle with a stiffened edge and FIGURES 7 through 10 show totally stiffened vehicles, FIGURE 12 show a vehicle made up of a plurality of sections of the previously described vehicles. In other words, FIGURE 12 comprises a plurality of panels distributed laterally rather than a single panel longitudinally distributed. These panels may be partially or substantially completely stiffened over their entire area as previously described. The longitudinal distribution provides an increase in the aspect ratio of the glider which then gives a greater gliding capability or larger lift area. Therefore a greater ability to glide a long distance results. More specifically, with reference to FIGURE 12, a plurality of fabric panels 100 are joined together laterally. The front edges 102 of panels 100 have, passing therethrough, taut lines, for example, of the character of a clothesline, which resists the force of the wind acting against the front edges of panels 100. Accordingly, the taut edges 102 are bowed slightly rearwardly and upwardly as shown in FIGURE 12. At the juncture of panels 100 are structural booms 104. Structural booms 104 may be any of the previously described structural elements which are flexible and collapsible, namely, an inflated structure, such as shown, flexible rods or foam filled tubes, all as previously described. Attached to the bottom front of structural booms 104 are load webs 106. Front load webs 106 lead to control bar 108 through load lines 110. Mounted at the rear end of outboard structural booms 104 are load webs 112 which are tied to control bar 108 by means of load web lines 114. Attached to the trailing edge of the outboard panels are controls pads or flaps 116. Control flaps 116 provide a reflex trailing edge which acts as a stabilizer as prevoiusly described. Control pads or flaps 116 are tied to control bar 108 by means of control lines 118. Attached adjacent the rear of the inboard structural booms 104 are rudders 120. Rudders 120 serve essentially the same purposes as the rudders previously described and are tied to control bar 108 by rudder lines 122. Attached to the bottom of control bar 108 is line 124. Line 124 generally represents a line tethered to the ground or another object; or, if the vehicle of 12 is to suspend a man, this line may not be used.

The device of FIGURE 13 is somewhat similar to that of FIGURE 12 and is really just another version of the same device. More specifically, the device of FIGURE 13 includes a stiffened or rigid leading edge 126. The stiffening may be by inflation, as shown, by a flexible rod, or by a foam filled tube, as previously mentioned. This leading edge comprises generally a front section 128 and side sections 130 and 132. Leading rearwardly from inflated leading edge 126 are body panels 134. The whole of the panels could be inflated if desired. Attached at the dividing lines between panels 134 are load webs 136 which join the outboard panels to the inboard panels. Also, adjacent outboard inflated edges 130 and 132 are load webs 138. Load webs 136 are attached to control bar 140 through load lines 142 and load webs 138 are attached to control bar 140 through load lines 144. The three inboard load webs 146 extend downwardly at the rear edges to form rudders 148. The center rudder 148 and load web 146 are tied together and terminate at their bottom in a V-tie to rudder line 150. This treatment of the center load web and rudder flap improves the stability of the vehicle. On either side of the center rudder flap, the load webs 146 lead to control bar 140 through load lines 152, and the rudders 148 are connected to control bar 140 by means of rudder lines 154. At the rear edges of the outboard ones of panels 134, reflex trailing edges or flaps 156 are formed. Flaps 156 are tied to control bar 140 by lines 158. The rudders, control flaps, load webs and other elements, as described, function in generally the same fashion as previously pointed out, in the discussion of the other forms of the present invention. Attached to the bottom of control bar 140 is line 160. As in the case of the previously described device, line 160 can be used as a tethering line either for tethering to the ground or to an object suspended above the surface of the earth or to a suspending vehicle.

As specifically pointed out with respect to FIGURES 12 and 13, the glider or vehicle of the present invention may be used for multiple purposes; including, the supporting of a single object or a man above the surface of the earth, as a glider for an object or a man, or it may be use as a tethered vehicle above the surface of the earth where it is tethered to the earth or to an object suspended above the earth or to various other suspending devices. Such tethered vehicles have numerous uses as observation and testing devices. In addition, the tethered vehicles can be controlled in their movement and in their areal coverage in substantially the same fashion as they are controlled by an individual suspended from the vehicle. In short, the control devices such as those shown in FIGURES 4 to 6 of the drawings can be utilized and remotely operated or other more conventional remote control devices can be employed.

I claim:

1. A device for suporting an object above the surface of the earth, comprising:
   (a) a generally-flat, flexible and cambered main body member;
   (b) said body member having a stiffened leading edge adapted to prevent substantial distortion by wind forces; and
   (c) rudder elements attached to and depending below the peripheral edge of said body member adjacent the rear thereof, said rudder elements also extending forwardly and outwardly toward the front of said body member and forming an acute angle with respect to a vertical plane cutting through the nominal center of said body member.

2. A device in accordance with claim 1 which includes a generally-flat, control flap on the rear edge of said body member to control the movement of said device.

3. A device in accordance with claim 2 wherein the control flap has attached thereto at least two control lines adapted to be moved in unison.

4. A device in accordance with claim 2 wherein the control flap has attached thereto at least two control lines adapted to be moved differentially.

5. A device in accordance with claim 1 which includes load webs passing along the underside of the main body member and adapted to be attached to the object being supported and to give said main body member an air-foil shape when in use.

6. A device in accordance with claim 1 wherein the leading edge of the body member is stiffened by means of an inflated edge portion containing a gas under superatmospheric pressure.

7. A device in accordance with claim 1 wherein the leading edge is stiffened by including therein a foam-type material capable of compression by the application of pressure and expansion upon release of said pressure.

8. A device in accordance with claim 1 wherein the leading edge is stiffened by at least one resilient, flexible rod capable of being forcibly coiled into a relatively small package and assuming an expanded contour when such force is released.

9. A device in accordance with claim 1 wherein a major portion of the body member including the leading edge of said body member is an inflatable envelope.

10. A device for supporting an object above the surface of the earth, comprising;
    (a) a generally flat, flexible and cambered main body member;
    (b) said body member having a stiffened leading edge adapted to prevent substantial distortion thereof by wind forces; and
    (c) rudder elements depending from said body member adjacent the rear corners thereof and forming an acute angle with respect to the sides of said body member; and
    (d) a major portion of said body member including the leading edge of said body member being an inflatable envelope containing a normally-gaseous material capable of liquefication at a relatively low superatomspheric pressure when the volume of said envelope is confined and of gasification upon expansion of the volume of said envelope to a substantially greater expanded volume.

11. A device in accordance with claim 10 which includes means for releasably compressing the envelope to a confined volume substantially less than its free expanded volume.

12. A device in accordance with claim 10 which includes elastic membrane means holding the top and bottom of said envelope together at preselected points.

13. A device in accordance with claim 12 which includes limiting means for selectively controlling the extent to which the membrane means are stretched.

14. A device in accordance with claim 10 which includes an expandable and contractable pressure tube in open communication with the envelope and sealed against the atmosphere.

15. A device in accordance with claim 14 which includes line and pulley means and in which said line is operated by expanding and contracting said pressure tube from a remote position outside the envelope.

16. A device in accordance with claim 2 which includes control means for releasably holding the control flap in a preselected position.

17. A device in accordance with claim 16 wherein the control means is a spring-loaded pulley means holding an excess of line attached to the control flap until the tension of said spring is released.

18. A device in accordance with claim 1 wherein the main body member includes a plurality of generally flat, flexible panels, load webs attached to said panels at their junctures and load lines attached to said load webs.

19. A device for suspension above the surface of the earth, comprising;
    (a) a plurality of generally-flat, flexible main body panels;
    (b) a stiffening element adjacent the leading edges of said panels;
    (c) rudder elements depending from said panels and forming acute angles with respect to the direction of wind movement past said device; and
    (d) structural booms attached to said panels at their junctures.

20. A device in accordance with claim 19 wherein the booms are elongated, flexible rods.

21. A device in accordance with claim 19 wherein the booms are elongated, inflated tubes.

22. A device in accordance with claim 19 wherein the rudders are integral extensions of load webs which are in turn attached to the panels at their junctures.

23. A device in accordance with claim 19 wherein control flaps are attached to the rearward edges of at least two panels adjacent the outboard sides of the device.

24. A device for supporting an object above the surface of the earth, comprising;
    (a) a generally flat, flexible and cambered main body member;
    (b) said body member having a stiffened leading edge adapted to prevent substantial distortion thereof by wind forces;
    (c) at least one generally-flat, flexible control flap means extending rearwardly from said main body member;
    (d) control line means attached to said control flap at the rear edge thereof; and
    (e) adjusting means mounted on said control line means intermediate the ends thereof and adapted to alternately shorten and extend that portion of the control line means between said adjusting means and said control flap without altering the length of that portion of the control line means below said adjusting means.

25. A device in accordance with claim 24 wherein the control flap includes two separate flaps mounted adjacent either side of the main body, respectively.

26. A device in accordance with claim 24 wherein the control line means includes at least one control line attached to the rear edge of the control flap means adjacent each side of said flap and the adjusting means adjusts said lines in unison.

27. A device in accordance with claim 24 wherein the control means includes at least one control line attached to the rear edge of the control flap means adjacent each side of said flap and the adjusting means adjusts each of said lines differentially.

28. A device in accordance with claim 24 wherein the adjusting means includes a spring means holding an excess of the control line until the tension of said spring is released.

29. A device in accordance with claim 24 wherein the adjusting means includes a spring-loaded pulley holding an excess of the control line until the tension of said spring is released.

References Cited

UNITED STATES PATENTS

| | | | |
|---|---|---|---|
| 1,031,148 | 7/1912 | Ranza | 244—31 |
| 1,035,560 | 8/1912 | Erdmann | 244—98 |
| 2,524,277 | 10/1950 | Stewart | 244—149 |
| 3,104,857 | 9/1963 | Knacke et al. | 244—145 |
| 3,127,137 | 3/1964 | Downing | 244—146 X |
| 3,148,393 | 9/1964 | McCuaig | 9—316 |
| 3,228,635 | 1/1966 | Hughes et al. | 244—152 X |
| 3,268,184 | 8/1966 | Biggar et al. | 244—1 |

FOREIGN PATENTS 585,513 12/1924 France.

MILTON BUCHLER, *Primary Examiner.*
R. A. DORNON, *Assistant Examiner.*